July 14, 1964    J. MERCIER    3,140,729
VALVE ASSEMBLY
Original Filed Feb. 23, 1956
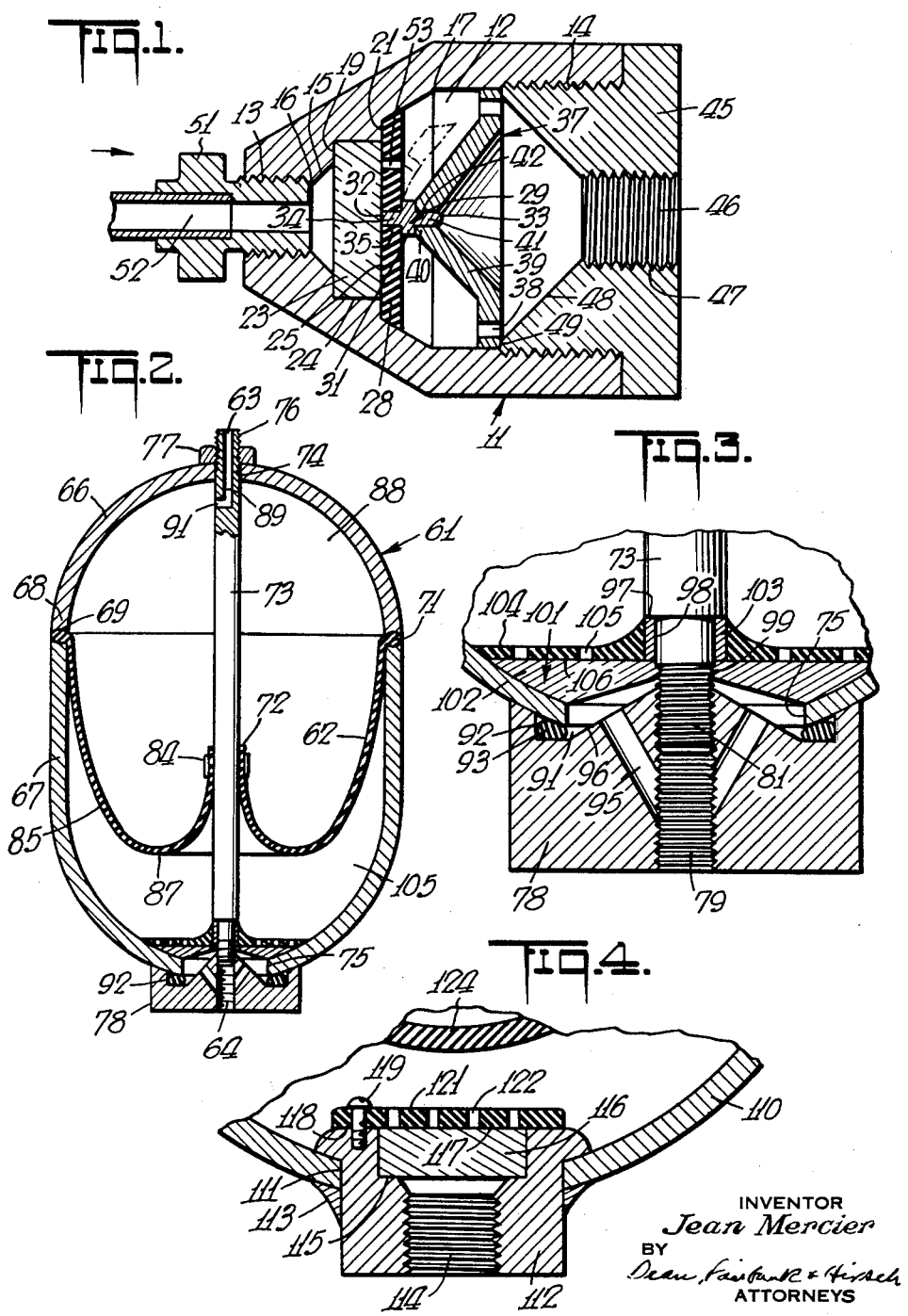
INVENTOR
Jean Mercier
BY
Dean, Fairbank & Hirsch
ATTORNEYS

United States Patent Office 3,140,729
Patented July 14, 1964

3,140,729
VALVE ASSEMBLY
Jean Mercier, 1185 Park Ave., New York, N.Y.
Original application Feb. 23, 1956, Ser. No. 567,110.
Divided and this application June 22, 1959, Ser. No. 822,005
2 Claims. (Cl. 138—30)

This invention relates to the art of valve assemblies, more particularly of the type utilizing a porous plug.

It is among the objects of the invention to provide a valve assembly that has but few parts that may be fabricated at relatively low cost, and which may readily be assembled and which will permit substantially unimpeded flow of fluid therethrough only in one direction.

Another object is to provide a valve assembly of the above type which will afford substantially unimpeded flow of fluid therethrough in one direction, but will afford only a predetermined limited flow in the opposite direction.

Still another object is to provide a valve assembly of the above type that may readily be incorporated in a pressure accumulator of the type having a deformable partition intervening between the gas and liquid ports thereof and which will permit ready flow of liquid into and out of the accumulator, but will prevent injury to the deformable partition when substantially all of the liquid has been expelled.

According to the invention these objects are accomplished by the arrangement and combination of elements hereinafter described and particularly recited in the claim.

This application is a division of co-pending application Serial No. 567,110 filed February 23, 1956, now abandoned.

In the accompanying drawings in which are shown one or more of various possible embodiments of the several features of the invention, FIG. 1 is a longitudinal sectional view of a valve assembly according to one embodiment of the invention, FIG. 2 is a longitudinal sectional view of a pressure accumulator according to another embodiment of the invention, FIG. 3 is a fragmentary view on a greatly enlarged scale of the valve assembly of FIG. 2, and FIG. 4 is a fragmentary view of a pressure accumulator incorporating a valve assembly according to still another embodiment of the invention.

Referring now to the drawings, the embodiment of the valve assembly shown in FIG. 1 desirably comprises a casing 11 having a bore 12 therethrough defining a passageway for fluid. The bore 12 is desirably cylindrical at the end portions 13, 14 thereof, the cylindrical portion 14 illustratively being of greater diameter than the cylindrical portion 13.

The bore 12 has a substantially conical wall portion 15 between the inner ends 16, 17 of cylindrical portions 13 and 14 and the wall portion 15 has spaced annular shoulders 19 and 21. Positioned on annular shoulder 19 which is slightly spaced from the inner end 16 of cylindrical portion 13, is a cylindrical porous plug 23 of any suitable material such as sintered bronze. The diameter of plug 23 is slightly less than the diameter of the cylindrical portion 24 formed between shoulders 19 and 21 so that it may readily fit therein and the thickness of said plug 23 is substantially equal to the length of said wall portion 24 so that the inner surface 25 of plug 23 will be substantially flush with shoulder 21.

Extending over the inner surface of plug 23 is a disc or valve member 28 of flexible material such as rubber like or plastic material, the periphery of which seats on annular shoulder 21.

Although the disc 28 and the porous plug 23 may be retained in position in any suitable manner, in the illustrative embodiment shown, a pin 29 is desirably provided which may have a collar 31 formed integral therewith between its ends 32, 33. The end portion 34 of pin 29 extends through an axial opening 35 in disc 28 and the length of end portion 34 is such that when the end 32 of the pin abuts against the surface 25 of plug 23, the collar 31 will be pressed against the disc 28.

To retain the pin 29 in position, a plate 37 is desirably provided of diameter slightly less than that of cylindrical portion 14. To permit passage of fluid, the plate 37 has a plurality of openings or passageways 38 adjacent its periphery. The central portion of the plate has a substantially conical conformation 39 with the apex 40 of said conformation 39 normally positioned adjacent to and slightly spaced from the disc 28 so that the end portion 41 of the pin 29 will extend through an opening 42 through the apex 40.

Means are provided to urge the plate 37 into the casing 11 so that the apex of the plate 37 will abut against the collar 29 securely yet releasably to retain the disc and the plug in position as shown.

To this end, a threaded plug 45 is provided which may be screwed into the correspondingly threaded cylindrical portion 14. The plug has an axial bore 46 therethrough threaded at its outer end as at 47 which tapers outwardly at the inner surface thereof as at 48 to define a rim 49 which may abut against the periphery of plate 37 to urge the latter inwardly.

In use of the valve assembly, a fitting 51 may be screwed into the threaded bore portion 13 and the area provided by the openings 38 in plate 37 is sufficient to permit full flow therethrough of the fluid passing through the bore 52 of fitting 51.

If the valve assembly is to be used as a one-way valve, the disc 28 will be imperforate. If the valve assembly is to be used as a flow damper, the disc 28 will have relatively small passageways 53 therethrough as shown.

Whether used as a flow damper or a one-way valve, when fluid under pressure is forced through fitting 51, it will pass through the porous plug 23 and deflect the disc 28 away from the surface 25 of the plug 23 so that such fluid may readily flow through openings 38 and through bore 46 of plug 45.

Where the disc 28 is imperforate and the valve assembly is used as a one-way valve, flow of fluid through bore 46 toward fitting 51 will be restrained as the disc will be urged by the fluid against the surface 25 of plug 23 to provide a seal.

Where the valve assembly is used as a flow damper and the disc 28 is perforated, flow of fluid through bore 46 toward fitting 51 will cause disc 28 to seat against the surface 25 of plug 28 and only a relatively small quantity of fluid will flow through openings 53.

The embodiment of the valve assembly shown in FIGS. 2 and 3 is illustratively incorporated in a pressure accumulator of the type having a rigid container 61 with a deformable partition 62 intervening between the gas and oil ports 63, 64 thereof.

The pressure accumulator desirably comprises a pair of cup-shaped, substantially cylindro-spherical shells 66, 67, desirably having the same outer diameter, the shell 67 preferably being of greater length than shell 66. Each of the rims 68 of the shells has an annular depression 69 therein between which the enlarged periphery or rim 71 of the deformable partition 62 may be positioned.

The parition 62 which desirably is of rubber, natural or synthetic, preferably is a circular disc of diameter considerably greater than the inner diameter of the shells 66 and 67 and has an axial opening 72 therethrough. The rims 68 of the shells are desirably clamped against the enlarged periphery 71 of the partition 62 by means of a central rod 73 which extends longitudinally through the juxtaposed shells 66 and 67, through axial opening 72 in partition 62 and through axial openings 74 and 75 at the ends of the shells respectively. The protruding end 76 of the rod 73 is desirably threaded so that it may receive a nut 77 and a block 78 having a threaded axial bore 79 which defines the port 64, is screwed upon the threaded end 81 of rod 73. The nut 77 and block 78 when tightened will move the shells 66 and 67 together so that the rims 68 thereof will press tightly against the enlarged rim 71, securely retaining the latter in place and providing a dependable seal between such rim portions of the shell.

The periphery of opening 72 in partition 62 is securely retained against the central rod 73 as by means of a suitable clamp 84. The dimensions of the partition 62 and the position at which the periphery of opening 72 thereof is clamped to the rod 73 are so selected that as shown in FIG. 2, the partition will hang downwardly in shell 67 to define a bladder that is substantially conical in cross section, the distance of the outer surface 85 of the partition from the inner wall of the shell progressively increasing from the enlarged rim 71 thereof to the reversely bent bottom 87 thereof.

Means are desirably provided to charge the chamber 88 of the accumulator on one side of the partition 62 with gas, for example. For this purpose end 63 of the central rod 73 desirably has a longitudinal bore 89 therein defining the gas port 63 at its outer end, and a transverse bore 91 leads from such longitudinal bore into the accumulator. As the valve means controlling the gas inlet port 63 is conventional, it is not shown.

The block 78 screwed on the end 81 of central rod 73, desirably has a circular depression 91 in the inner face thereof against the wall 92 of which is positioned a suitable resilient sealing ring 93, preferably of rubber, which, when the block 78 is tightened will press against the outer surface of the shell 67 adjacent the periphery of opening 75 to effect a liquid tight seal. The bore 79 of block 78 is of such length that the end 81 of the rod 73 will only extend partially therethrough and passageways 95 extend through the surface 96 of depression 91 into the portion of bore 79 below the end 81 of rod 73.

The end 81 of rod 73 is desirably of reduced diameter defining an annular shoulder 97 and the portion 98 of said end 81 adjacent shoulder 97 is unthreaded. The end 81 of rod 73 extends through the axial opening 99 of a porous plate 101 of suitable material such as sintered bronze, the diameter of plate 101 being such that its periphery 102 which is rounded to conform to the curvature of the inner surface of shell 67 adjacent opening 75 may seat against said inner surface.

Positioned between plate 101 and shoulder 97 is a sleeve 103 to which is bonded a disc 104 of flexible resilient material such as natural or synthetic rubber, said disc having a plurality of relatively small perforations 105 therethrough. The diameter of the disc is such that when seated against the inner surface 106 of plate 101 it will completely cover such inner surface.

In the operation of the pressure vessel shown in FIG. 2, gas under pressure is initially charged into the container through port 63 and such port is thereupon sealed.

As oil under pressure greater than that in the gas chamber 88 is forced through the bore of block 78, such oil will flow through passageway 95 and through the porous plate 101 to deflect the resilient disc 104 away from the inner surface of said plate 101 so that a large flow of oil is permitted into the oil chamber 105. As a result, the partition 62 will be deformed and the gas in the chamber 88 will be compressed.

When the pressure in the line leading to the bore 79 in block 78 falls below that of the compressed gas in the chamber 88, the partition will move outwardly forcing oil from chamber 105. As such oil starts to flow out of chamber 105, the disc 104 will seat on the surface 106 of the porous plate 101 and oil will flow through the perforations 105 in disc 104 and the porous plate 101 through passageways 95 and bore 79.

When the partition 62 has expanded so that substantially all of the oil has been forced from the container, the reversely bent end 87 of the partition will press against the disc 104 causing the latter to deform so that the perforations 105 therein will close thereby preventing injury to the partition which would occur if it pressed directly against the porous plate 101.

In the embodiment shown in FIG. 4, the valve assembly is illustratively shown incorporated in the oil port 111 of a pressure vessel 110 of conventional type such as that shown in Reissue Patent No. 23,343. The valve assembly comprises a plug 112 secured in the oil port as by welding at 113, said plug having a bore 114 therethrough of enlarged diameter at its inner end defining an annular shoulder 115. Seated on shoulder 115 is a porous plug 116 of suitable type, the inner surface 117 of which is desirably flush with the inner end 118 of plug 112.

Affixed as by screw 119 to the inner end of plug 112 is a disc 121 of resilient flexible material which extends over the inner surface of plug 116 and defines a flap valve, the disc having perforations 122 therethrough. The disc 121 is preferably of harder material than the deformable partition 124 to resist the abrasive effect of the porous seat 116. The partition must have physical characteristics which are necessarily incompatible with those resisting the abrasive effect of the porous seat, thus dissociating the partition function from the contact function with the valve.

The pressure vessel shown in FIG. 4 will function in substantially the same manner as that shown in FIG. 2. Thus, the flap or disc 121 will move away from the inner surface of plug 116 when oil is forced into the container 110 and upon flow of oil out of the container 110 with expansion of the definable partition 124, when such partition engages the disc 121 it will deform the latter to close the perforations 122 therethrough to prevent injury to such partition.

The valve assembly shown in FIG. 4 may be used to control the gas inlet port of a pressure accumulator. In such case, the disc would be imperforate so that after gas was forced through the porous plug 116 to deflect the disc 121 away therefrom, the pressure of the gas in the container would retain the imperforate disc 121 against the porous plug to seal the gas port. Thus, if the partition should be deformed sufficiently to engage the gas port, the resilient disc 121 would prevent extrusion of such partition through the porous plug 116.

As many changes could be made in the above constructions, and apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. A pressure vessel comprising a rigid container having a port and a deformable expansible partition therein defining two chambers, one of which is in communication with said port, a rigid porous member extending over said port, a flexible member positioned in said container and extending over the surface of said porous member, said flexible member having a plurality of passageways therethrough, said partition upon expansion thereof abutting against said flexible member and means mounting said flexible member to permit movement of at least a portion thereof away from said porous member.

2. The combination set forth in claim 1 in which a plug is mounted in said port, said plug having a bore therethrough of enlarged diameter at its inner end defining a shoulder, a porous plug seated on said shoulder and of thickness such that its inner surface is substantially flush with the inner surface of said plug, a flap of resilient material extending over the inner surface of said porous plug and means to secure a portion of said flap to the inner end of said plug.

References Cited in the file of this patent

UNITED STATES PATENTS

| | | |
|---|---|---|
| 2,399,444 | Mercier | Apr. 30, 1946 |
| 2,558,471 | Whitlock | June 26, 1951 |
| 2,630,834 | Weber et al. | Mar. 10, 1953 |
| 2,778,445 | Brixius | Jan. 22, 1957 |
| 2,877,801 | Mercier | Mar. 17, 1959 |